(12) United States Patent  
Horie

(10) Patent No.: US 9,247,135 B2  
(45) Date of Patent: Jan. 26, 2016

(54) ELECTRONIC DEVICE AND IMAGING APPARATUS

(71) Applicant: PANASONIC CORPORATION, Osaka (JP)

(72) Inventor: Satoshi Horie, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/275,584

(22) Filed: May 12, 2014

(65) Prior Publication Data

US 2014/0354870 A1  Dec. 4, 2014

(30) Foreign Application Priority Data

May 29, 2013  (JP) ................................. 2013-112608  
Apr. 8, 2014  (JP) ................................. 2014-079105

(51) Int. Cl.
  *G06F 1/32*  (2006.01)
  *H04N 5/232*  (2006.01)

(52) U.S. Cl.
  CPC .......... *H04N 5/23241* (2013.01); *G06F 1/3234* (2013.01); *G06F 1/3287* (2013.01); *H04N 5/23216* (2013.01); *H04N 5/23245* (2013.01); *H04N 5/23293* (2013.01)

(58) Field of Classification Search
  CPC ........... H04N 5/23241; H04N 5/23293; G06F 1/3234; G06F 1/3287
  See application file for complete search history.

(56) References Cited

U.S. PATENT DOCUMENTS 6,560,713 B1 * 5/2003 Chary ........................... 713/340  
8,069,277 B2  11/2011 Suematsu  
2008/0133956 A1 * 6/2008 Fadell ........................... 713/340

FOREIGN PATENT DOCUMENTS

JP  2009-176190 A  8/2009

* cited by examiner

*Primary Examiner* — Paul Berardesca  
(74) *Attorney, Agent, or Firm* — McDermott Will & Emery LLP

(57) ABSTRACT

The electronic device has a power supply input unit which inputs power from an external power supply, an information processing unit which is capable of performing a first function and a second function which consumes more power than the first function does, a display unit which responds to power input to the power supply input unit by displaying whether or not to allow the performance of the first function and the performance of the second function, and an operation unit which receives an operation to be performed in response to the display on the display unit. The information processing unit switches between allowing only the performance of the first function and allowing both of operation in the first function and the performance of the second function according to the operation received by the operation unit.

4 Claims, 4 Drawing Sheets

FIG. 4

| First function | Second function |
|---|---|
| Controlling of liquid crystal monitor | Controlling of CMOS image sensor |
| Controlling of operation unit | Controlling of lenses |
| Controlling of playback mode | Controlling of photographing mode |

ELECTRONIC DEVICE AND IMAGING APPARATUS

RELATED APPLICATIONS

This application claims the benefit of Japanese Application No. 2014-079105, filed Apr. 8, 2014, and the benefit of Japanese Application No. 2013-112608, filed on May 29, 2013, the disclosures of which Applications are incorporated by reference herein.

BACKGROUND OF THE INVENTION

1. Field of the Invention

The present disclosure relates to an electronic device and an imaging apparatus which can draw power from an external power supply through a communication cable.

2. Description of the Related Art

There have been known electronic devices which can operate on an external power supply such as another electronic device through a communication cable. For example, an electronic device which is connected to a USB (Universal Serial Bus)-compliant host device via a USB cable operates on a host device, i.e., an external USB power supply. When the above described electronic device which can operate on a host device is made to perform an operation which consumes current exceeding 500 mA, which is the maximum current value to be supplied from the external USB power supply as specified in the USB standard, the USB power supply and the electronic device may malfunction. To solve that problem, there have been disclosed configurations for preventing the malfunctions which would otherwise occur by providing a USB host device with an extended power mode in which the USB host device can supply non-standard current not defined in the USB standard and by causing an electronic device to enable its main operation part to perform an operation which consumes non-standard current higher than 500 mA specified in the USB standard as the maximum current value on the condition that the electronic device has confirmed that the host device has the extended power mode (for example, see Unexamined Japanese Patent Publication No. 2009-176190).

It is an object of the present disclosure to provide an electronic device and an imaging apparatus which can make efficient use of power supply capability of an external power supply.

SUMMARY OF THE INVENTION

An electronic device of the present disclosure has a power supply input unit which inputs power from an external power supply; an information processing unit which is capable of performing a first function and a second function which consumes more power than the first function does; a display unit which responds to power input to the power supply input unit by displaying whether or not to allow performance of the first function and performance of the second function; and an operation unit which receives an operation to be performed in response to the display on the display unit. The information processing unit switches between allowing only the performance of the first function and allowing both of operation in the first function and the performance of the second function according to the operation received by the operation unit.

According to the present disclosure, an electronic device and an imaging apparatus which can make efficient use of power supply capability of an external power supply can be provided.

BRIEF DESCRIPTION OF DRAWINGS

FIG. 4 is a table showing examples of a first function and a second function of the imaging apparatus according to the first exemplary embodiment.

DETAILED DESCRIPTION OF THE PREFERRED EMBODIMENTS

Figure 1:
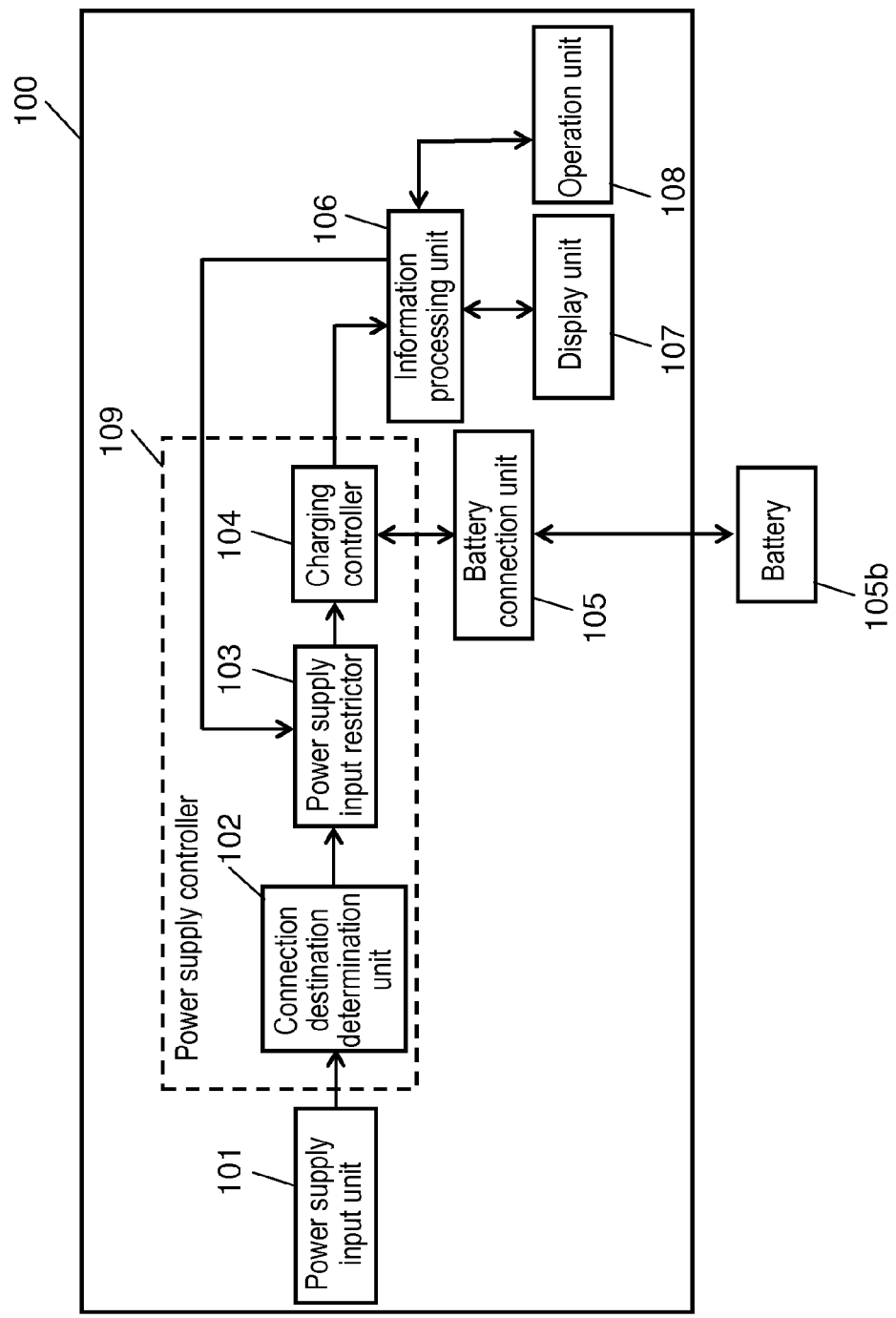
FIG. 1 is a block diagram illustrating a configuration of an electronic device according to a first exemplary embodiment.

Hereinafter, exemplary embodiments are described in detail suitably with reference to the drawings. However, excessively detailed description may be omitted. For example, detailed description of matters that are already well known, or redundant description for substantially the same configuration may be omitted. This is to avoid making the following description unnecessarily redundant, and to facilitate the understanding by a person skilled in the art.

The attached drawings and the following description are provided in order that a person skilled in the art sufficiently understands the present disclosure, and are not intended to limit the subject matter recited in the scope of the claims.

First Exemplary Embodiment

Electronic devices which operate by using an external USB power supply may not only be connected to and draw power from a device which has a host function such as a PC (Personal Computer) but may also be connected to and draw power from an external USB power supply which has no host function such as a USB-AC (Alternating Current) adaptor. By short-circuiting the D+ terminal and the D-terminal specified in the USB standard at a predetermined resistance value or lower, the USB-AC adapter can prove to a USB-compliant electronic device that the USB-AC adapter has more than 500 mA power supply capability.

Even in the case where that kind of USB-AC adaptor is connected as an external USB power supply to an electronic device and the electronic device recognizes that the USB-AC adaptor can supply power more than 500 mA, the electronic device may malfunction due to lack of power supply capability of the USB-AC adaptor, when operation of the electronic device needs more than 500 mA power supply. For example, there is a case where the USB-AC adaptor has 800 mA power supply capability but operation of the electronic device needs 1500 mA power supply.

Then, in order to prevent the malfunction in the USB-AC adaptor in that case, a measure to restrict the electronic device to be operable only by drawing 500 mA power supported by the USB standard can be considered. However, with that measure, the USB-AC adaptor cannot support some operations of the electronic device which need more than 500 mA power supply.

On the other hand, in order to ensure operation of the electronic device, a measure to allow the USB-AC adaptor to supply power to the electronic device without restriction can be considered. However, with that measure, the electronic device may demand power larger than the power supply capabilities of some of that kind of USB-AC adaptors to be connected so that the power supply to the electronic device may be unexpectedly cut off and the electronic device may be abruptly powered off.

Besides, the configuration disclosed in Unexamined Japanese Patent Publication No. 2009-176190 not only needs to make the host device include a configuration of notifying the electronic device that the host device is operable in the extended power mode or is operating in the extended power mode but also needs to make the electronic device to include means for confirming that the host device is operating in the extended power mode.

Therefore, it is an object of the present disclosure to provide an electronic device and an imaging apparatus which can make efficient use of power supply capability of an external power supply.

When an external USB power supply is connected to the electronic device according to the first exemplary embodiment, the electronic device determines the type of the connected external USB power supply. When the electronic device is powered on in the case where it is connected to an USB-AC adaptor, it temporarily starts in an operation mode in which the electronic device can operate at current of 500 mA or lower as supported by the USB charging standard (hereinafter, referred to as a power-saving mode). Then, the electronic device prompts the user to select whether or not to allow all operations of the electronic device. On the condition that the user selects to allow all operations, the electronic device performs the operation without restriction.

The configuration and the operation of the electronic device according to the first exemplary embodiment will be described below.

1. Configuration of the Electronic Device

The configuration of the electronic device will be described with reference to FIG. 1. FIG. 1 is a block diagram illustrating a configuration of an electronic device. Electronic device 100 includes power supply input unit 101, connection destination determination unit 102, power supply input restrictor 103, charging controller 104, battery connection unit 105, information processing unit 106, display unit 107, and operation unit 108. Battery 105*b* is connected to battery connection unit 105.

Power supply input unit 101, which is a terminal for receiving power from an external USB power supply, is a USB connection terminal. Power supply input unit 101 can be connected to a D+ data line and a D− data line of the external USB power supply.

Connection destination determination unit 102 determines the type of the external USB power supply by performing a confirming operation specified in the USB charging standard on the D+ data line and the D− data line of the external USB power supply connected to power supply input unit 101. Connection destination determination unit 102 is configured to be able to solely perform the determining operation even when information processing unit 106 which is responsible for main processing of electronic device 100 is not activated. Connection destination determination unit 102 is further configured to be able to perform the determining operation even when battery 105*b* is not connected to electronic device 100.

Power supply input restrictor 103 controls power supplying from power supply input unit 101 to charging controller 104 and to subsequent information processing unit 106 according to the determination result from connection destination determination unit 102 or instructions from information processing unit 106.

Charging controller 104 controls a charging operation performed on battery 105*b*. Specifically, charging controller 104 supplies the power supplied from power supply input unit 101 to battery 105*b* connected to battery connection unit 105 and charges battery 105*b*. Further, charging controller 104 supplies information processing unit 106 at predetermined voltage, for example 5V, with one or both of the power supplied from power supply input unit 101 and the power supplied from battery 105*b*. On the latter occasion, charging controller 104 performs switching control on the power supply for the respective units of electronic device 100 between the external USB power supply and battery 105*b*. Thus, charging controller 104 can output two kinds of voltage, i.e., the voltage for charging battery 105*b* and the voltage for driving the units including information processing unit 106. Charging controller 104 is a charging control IC, for example. Charging controller 104 forms power supply controller 109 in conjunction with connection destination determination unit 102 and power supply input restrictor 103. The whole of power supply controller 109 may be formed as a single charging control IC.

Information processing unit 106 includes a CPU and the like, for example, and performs respective processes for implementing a first function and a second function of electronic device 100 by the CPU executing predetermined programs. The first function can operate at current of 500 mA or lower supported by the USB charging standard and is a reproduction process function of a recorded image, for example. The second function cannot operate at current of 500 mA or lower supported by the USB charging standard and is an encoding function of an image, for example. The first function can assuredly operate only by the power supplied from power supply input unit 101. The second function needs power larger than the first function does, i.e., needs power larger than 500 mA, therefore, the second function cannot operate or may be unstable with only the power supplied from power supply input unit 101. Information processing unit 106 may be adapted to implement these functions only by a hardware circuit.

Display unit 107 displays characters and images which have undergone respective processes and have been output from information processing unit 106. Display unit 107 is made of a liquid crystal monitor or an organic EL monitor, for example.

Operation unit 108, which includes buttons, levers, dials, and a touch panel, receives user operation and transmits the operation signal to information processing unit 106.

Display unit 107 and operation unit 108 are examples of user interface for outputting/receiving information to/from the user.

2. Operation

Figure 2:
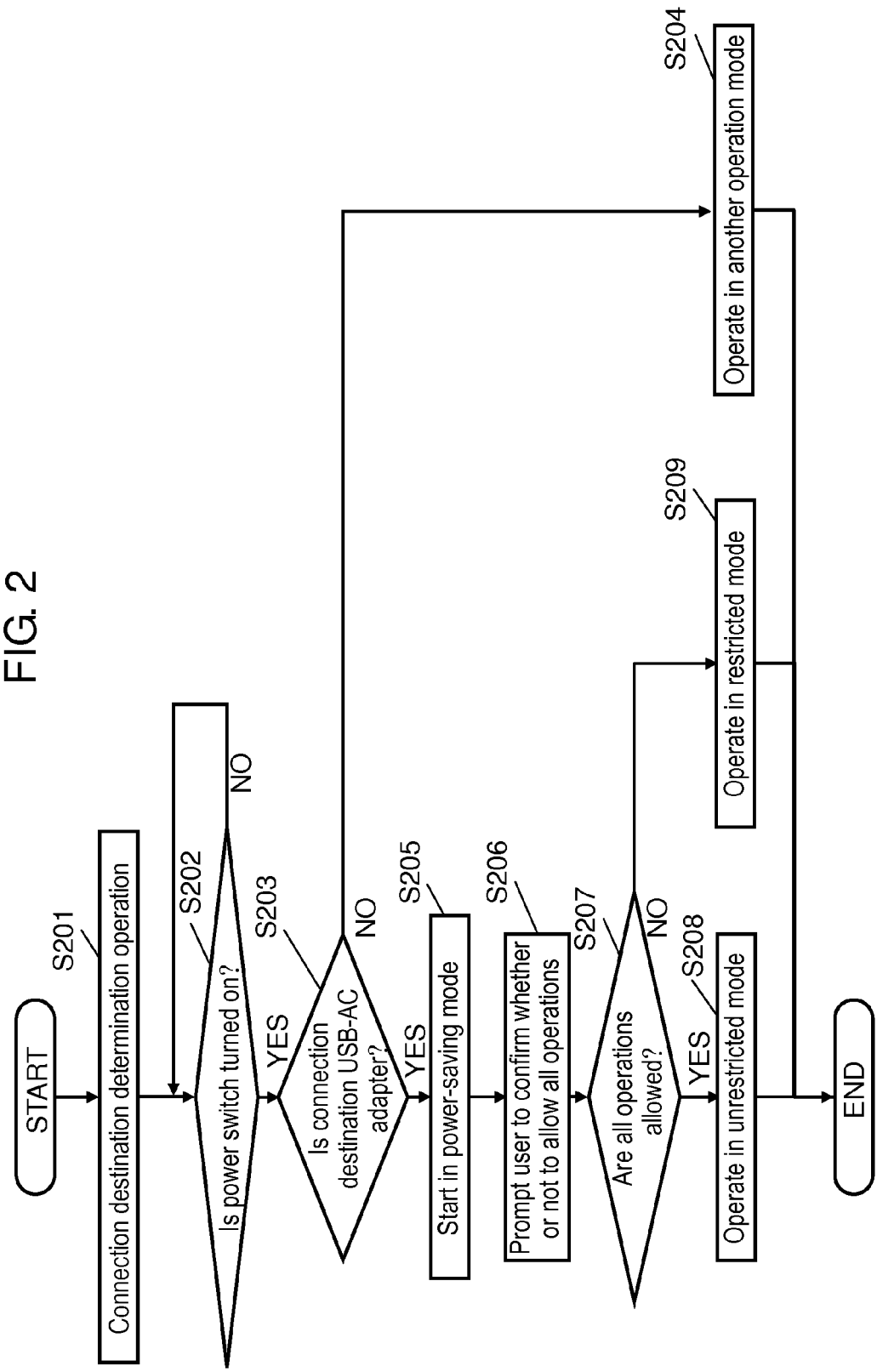
FIG. 2 is a flowchart describing operation of the electronic device according to the first exemplary embodiment.

FIG. 2 is a flowchart describing operation of electronic device 100 when an external USB power supply is connected to electronic device 100.

When an external USB power supply is connected to power supply input unit 101 of electronic device 100, power supply controller 109 has power supplied from the USB power supply and starts operation.

(Step S201) Connection destination determination unit 102 determines the type of the connected external USB power supply by performing a confirming operation specified in the USB charging standard on the D+ data line and the D− data line of the USB power supply. Connection destination determination unit 102 determines that the external USB power supply is a USB-AC adaptor on the condition that, for example, voltage of a predetermined value or more is measured at the D− data line while a predetermined voltage is applied to the D+ data line. The determination result is stored in a register of connection destination determination unit 102. A 500 mA current can be supplied from the external USB power supply in the case where it is determined that the external USB power supply is a USB-AC adaptor. In that case, charging controller 104 may or may not charge battery 105b connected to battery connection unit 105 using the power supplied from the external USB power supply. In the case where the connection destination is an USB-AC adaptor, electronic device 100 temporarily starts in an operation mode in which electronic device 100 can operate at current of 500 mA or lower as supported by the USB charging standard (hereinafter, referred to as a power-saving mode).

(Step S202) After connection destination determination unit 102 has determined the connection destination, power supply input restrictor 103 confirms whether electronic device 100 is powered on or not. Power supply input restrictor 103 determines whether electronic device 100 is powered on or not by detecting whether the power switch (not shown) connected to power supply input restrictor 103 is turned on or not. In the case where the power switch is turned on ("YES" in step S202), the operation proceeds to step S203. In the case where the power switch is not turned on ("NO" in step S202), power supply input restrictor 103 waits until the power switch is turned on.

(Step S203) When the power switch is turned on, power is supplied from the external USB power supply to entire electronic device 100 including information processing unit 106 by power supply input restrictor 103 and information processing unit 106 starts operation. When the power switch is turned on and information processing unit 106 starts operation, information processing unit 106 first confirms the connection destination determination result by reading out it from a register of connection destination determination unit 102. In the case where it is determined that the connected external USB power supply is something other than a USB-AC adapter ("NO" in step S203), the operation proceeds to step S204.

(Step S204) In the case where it is determined that the connected external USB power supply is something other than a USB-AC adapter, information processing unit 106 causes electronic device 100 to operate in an operation mode corresponding to the connected destination. For example, in the case where the connected external USB power supply is a PC, electronic device 100 operates in a mass storage mode.

(Step S205) In the case where the connected external USB power supply is a USB-AC adapter ("YES" in step S203), information processing unit 106 temporarily starts entire electronic device 100 in a power-saving mode in which electronic device 100 can start at current of 500 mA or lower as supported in the USB-AC adapter by the USB charging standard.

(Step S206) After information processing unit 106 has started entire electronic device 100 in a power-saving mode, it prompts the user to confirm whether or not to allow all operations of electronic device 100. For example, the confirmation is performed as below. Information processing unit 106 causes display unit 107 to display options for selecting whether or not to allow all operations. The user selects one of these options indicating to allow all operations and not to allow all operations by operating operation unit 108.

(Step S207) Information processing unit 106 determines the selection result made by the user based on the input performed by the user on operation unit 108. In the case where information processing unit 106 determines that the user allows all operations of electronic device 100 ("YES" in step S207), the operation proceeds to step S208. In the case where information processing unit 106 determines that the user does not allow all operations of electronic device 100 ("NO" in step S207), the operation proceeds to step S209.

(Step S208) In the case where information processing unit 106 determines that the user allows all operations of electronic device 100 ("YES" in step S207), information processing unit 106 causes electronic device 100 to operate in an unrestricted mode. The unrestricted mode refers to a mode which allows every operation possible to electronic device 100, therefore, which allows both the first function and the second function to be performed. That is, the unrestricted mode is the mode in which information processing unit 106 allows the operations of the first function and the second function. Therefore, on the condition that the external USB power supply has so high power supply capability that it can supply power required to perform the second function, electronic device 100 can perform the operation in the second function. However, in the case where electronic device 100 bears too much load for the power supply capability of the connected USB-AC adaptor, the power supply from the USB-AC adaptor is insufficient for the operation of electronic device 100, which may lead such a trouble as a power-off of electronic device 100.

(Step S209) In the case where information processing unit 106 determines that the user does not allow all operations of electronic device 100 ("NO" in step S207), information processing unit 106 causes electronic device 100 to operate in a restricted mode. The restricted mode refers to a mode which forbids any operation consuming power from the USB-AC adapter over 500 mA, i.e., which allows only the operation available within the power supply of 500 mA. In other words, the restricted mode is the mode which allows only the operation in the first function. When electronic device 100 operates in the restricted mode, it operates with 500 mA ensured by the USB-AC adapter though it cannot perform the operation in the second function. Therefore, unlike the unrestricted mode, the restricted mode involves no risk of making the operation of electronic device 100 unstable so that electronic device 100 is abruptly powered off.

As described above, in the first exemplary embodiment, electronic device 100 has the power supply input unit which inputs power from an external power supply; the information processing unit which is capable of performing a first function and a second function which consumes more power than the first function does; the display unit which responds to power input to the power supply input unit by displaying whether or not to allow performance of the first function and performance of the second function; and the operation unit which receives an operation to be performed in response to the display on the display unit. The information processing unit switches between allowing only the performance of the first function and allowing both of operation in the first function and the performance of the second function according to the operation received by the operation unit.

As a result, when a USB-AC adapter is connected to electronic device 100, the exemplary embodiment can prompt the user to select whether or not to allow all operations of electronic device 100. Therefore, when a USB-AC adapter with high power supply capability is connected to electronic device 100, the user can make electronic device 100 to perform all operations by allowing them. Accordingly, the power supply capability of the external USB power supply can be efficiently used. On the other hand, when a USB-AC adapter with low power supply capability or an unknown USB-AC adapter is connected to electronic device 100, the user can prevent such a trouble as an abrupt power-off of electronic device 100 due to lack of power supply by not allowing all operations and making electronic device 100 to operate in the restricted mode. That is, the first exemplary embodiment can provide an electronic device which prevents occurrence of malfunctions in a situation the user has not expected.

3. Other Exemplary Embodiments

The first exemplary embodiment has been described as an example of the technology disclosed in the present application. However, the technology in the present disclosure is not limited to the first exemplary embodiment. Various modifications, substitutions, additions, and omissions may be made to the first exemplary embodiment as required without departing from the spirit and scope of the technology. Further, the respective constituent elements described in the first exemplary embodiment may be combined into a new exemplary embodiment. Then, other exemplary embodiments will be described below.

Although it is described that the user is prompted to confirm whether or not to allow all operations of electronic device 100 in step S206 of FIG. 2 in the first exemplary embodiment, the present disclosure may be configured to respond to the case where all operations have been allowed once by omitting the process in step S206 performed at the time of starting electronic device 100 and by causing electronic device 100 to operate in the unrestricted mode each time electronic device 100 starts until the confirmation is reset. Specifically, the present disclosure may be configured to cause information processing unit 106 to store a history of the input made by the user in a memory or the like so that electronic device 100 determines whether all operations are allowed or not by reading out the information from the memory instead of prompting the user to perform the confirmation. In contrast, the exemplary embodiment may be configured to respond to the case where the user has selected not to allow all operations once by omitting the process in step S206 performed at the time of starting the electronic device 100 thereafter and by causing electronic device 100 to operate in the restricted mode each time electronic device 100 starts.

Specifically, the electronic device is configured to respond to the case where the operation in the first function and the performance of the second function have been allowed by causing the information processing unit not to prompt the user to select whether or not to allow the operation in the first function and the operation in the second function while power is input from the power supply input unit.

That configuration saves electronic device 100 the process of prompting the user to make the confirmation every time, therefore, the configuration can save the user the time and effort.

Alternatively, electronic device 100 may be configured to include an item for setting whether or not to allow all operations as a menu item so that it responds to the case where the item is previously set to allow or not to allow all operations by omitting the process in step S206 and operating in the mode corresponding to the item set in the menu and only responds to the case where the menu item is set to prompt the user to confirm the matter every time electronic device 100 is started by prompting the user to confirm the matter at the time the user starts electronic device 100 as in the above described exemplary embodiment.

Although it is described that electronic device 100 operates in a mass storage mode in step S205 of FIG. 2 as an example of operation in the case where a PC is connected as a device other than the external USB-AC adapter in the above exemplary embodiment, electronic device 100 may be configured to perform another operation. Yet alternatively, electronic device 100 may be configured to operate in different operation modes according to the presence or absence of battery 105*b* such that it operates in the mass storage mode in the case where battery 105*b* is present and does not operate, i.e., does not start in the case where battery 105*b* is absent.

Although it is described that connection destination determination unit 102, power supply input restrictor 103, and charging controller 104 respectively have the above functions and configurations in the above exemplary embodiment, electronic device 100 may be configured to have the functions and configurations of these units partially included in the other units.

Although it is described that charging controller 104 and information processing unit 106 respectively have the above functions and configurations in the above exemplary embodiment, electronic device 100 may be configured to have the function and configuration of one of the units partially included in the other unit.

Although it is described that information processing unit 106 prompts the user to confirm whether or not to allow all operations of electronic device 100 in step S206 in the above exemplary embodiment, information processing unit 106 may be configured to prompt the user to more specifically confirm whether or not to allow the operation in the second function.

The concept of the power supply control described in the above exemplary embodiment can apply to various kinds of electronic devices. For example, the concept can apply to an imaging apparatus which has a function of capturing an image such as a digital camera, a movie camera, and a smart phone.

4. Configuration of the Imaging Apparatus

Figure 3:
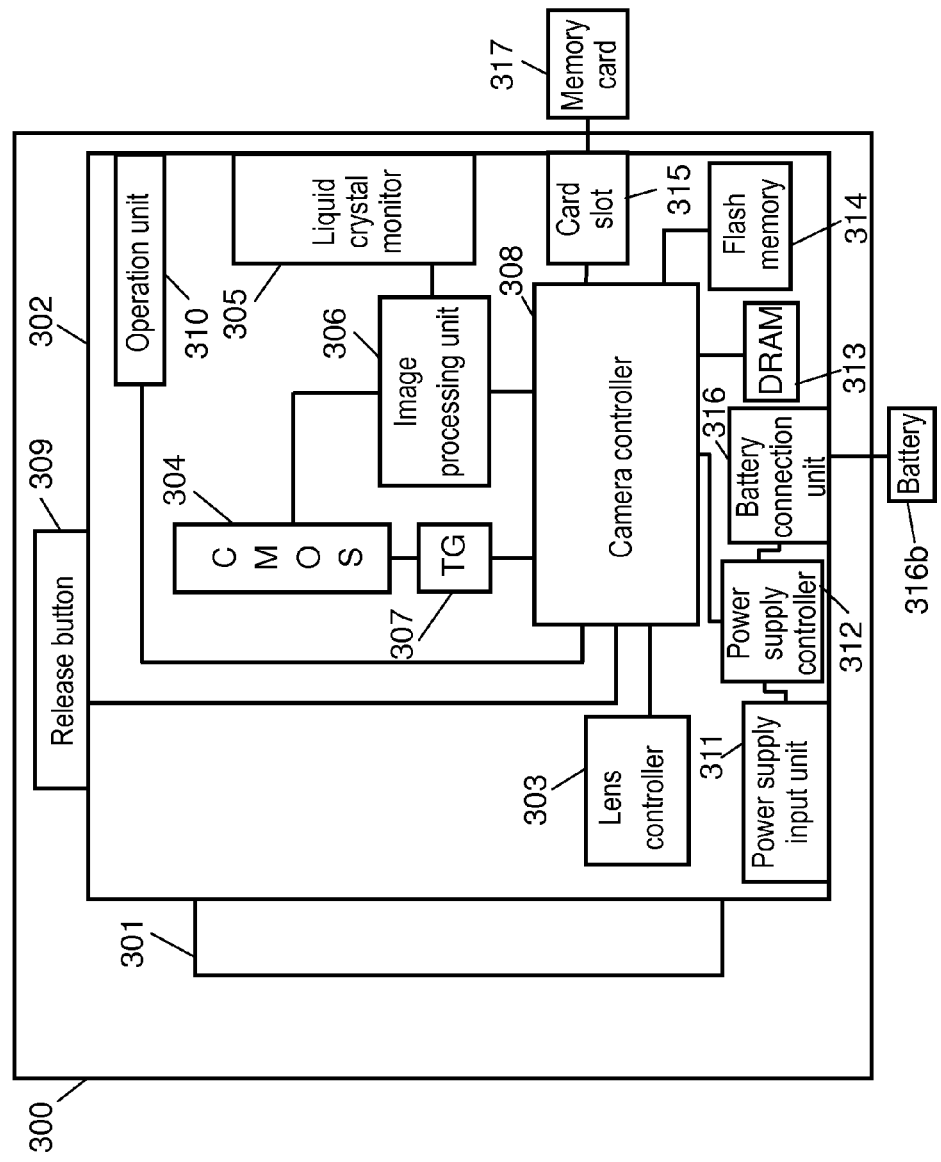
FIG. 3 is a block diagram illustrating a configuration of an imaging apparatus according to the first exemplary embodiment.

As an imaging apparatus, a digital camera having the configuration of the power supply control illustrated in FIG. 1 applied will be described with reference to FIG. 3. FIG. 3 is a diagram illustrating the configuration of digital camera 300. Digital camera 300 has lenses 301 and camera body 302.

Camera body 302 has lens controller 303, CMOS image sensor 304, liquid crystal monitor 305, image processing unit 306, timing generator (TG) 307, camera controller 308, release button 309, operation unit 310, power supply input unit 311, power supply controller 312, DRAM 313, flash memory 314, card slot 315, and battery connection unit 316. Battery 316*b* is connected to battery connection unit 316. Memory card 317 is connected to card slot 315.

Here, power supply input unit 101 in FIG. 1 corresponds to power supply input unit 311 in FIG. 3, power supply controller 109 in FIG. 1 corresponds to power supply controller 312 in FIG. 3, information processing unit 106 in FIG. 1 corresponds to camera controller 308 in FIG. 3, display unit 107 in FIG. 1 corresponds to liquid crystal monitor 305 in FIG. 3, and operation unit 108 in FIG. 1 corresponds to release button 309 and operation unit 310 in FIG. 3. Battery connection unit 105 and battery 105*b* in FIG. 1 correspond to battery connection unit 316 and battery 316*b* in FIG. 3, respectively.

Lens controller 303 controls the operation of entire lenses 301. Lens controller 303 may be made of a hardwired electronic circuit or a microcomputer using a program.

Camera controller 308 controls the operation of entire digital camera 300 by controlling each component such as CMOS image sensor 304 according to instructions from operating members including release button 309 and operation unit 310. Camera controller 308 sends a vertical synchronizing signal to timing generator 307. In parallel to the sending process, camera controller 308 generates an exposure synchronizing signal based on the vertical synchronizing signal. Camera controller 308 periodically repeats sending the generated exposure synchronizing signal to lens controller 303. With that operation, camera controller 308 can control the lenses including a focus lens in lenses 301 in synchronization with the exposure. Camera controller 308 uses DRAM 313 as a work memory in performing a control operation or an image processing operation. Camera controller 308 may be made of a hardwired electronic circuit or a microcomputer using a program. Alternatively, camera controller 308, image processing unit 306, and DRAM 313 may be integrated on the same semiconductor chip or fabricated on separate semiconductor chips. Further, camera controller 308 controls operation of digital camera 300 based on the determination result of the external USB power supply connected to power supply input unit 311. Specifically, in the case where it is determined that the external USB power supply is something other than a USB-AC adapter, camera controller 308 controls digital camera 300 to be able to operate in another mode such as the mass storage mode. In the case where it is determined that the external USB power supply is a USB-AC adapter, camera controller 308 controls liquid crystal monitor 305 to display options for the user to select whether or not to allow all operations. When the user selects to allow all operations, camera controller 308 controls digital camera 300 to perform both the first function and the second function, and when the user selects the restricted mode, camera controller 308 controls digital camera 300 to perform only the first function.

CMOS image sensor 304 is configured to include a light-receiving element, an AGC (Automatic Gain Controller), and an AD converter. The light-receiving element converts optical signals collected by lenses 301 into electric signals and generates image data. The AGC amplifies the electric signal output from the light-receiving element. The AD converter converts the electric signal output from the AGC into a digital signal. CMOS image sensor 304 operates with timing controlled by timing generator 307. The operations of CMOS image sensor 304 under the control of timing generator 307 includes an imaging operation of a still image, an imaging operation of a through image, a data transfer operation, and an electronic shutter operation. A through image, which is primarily a moving image, is displayed on liquid crystal monitor 305 for the user to compose the still image to capture. The image information generated by CMOS image sensor 304 is supplied to image processing unit 306 by camera controller 308. Another imaging device such as an NMOS image sensor or a CCD image sensor may be used in place of CMOS image sensor 304.

Image processing unit 306 performs predetermined image processing on the image data which has been converted into the digital signals by the AD converter of CMOS image sensor 304. The predetermined image processing includes, but not limited to, a gamma correction process, a white balance correction process, a flaw correction process, a YC conversion process, a digital zoom process, a compression process, and an expansion process.

Liquid crystal monitor 305 is a display unit installed on the rear of camera body 302. Liquid crystal monitor 305 displays an image represented by the image data for display processed by image processing unit 306. Liquid crystal monitor 305 can selectively display a moving image and a still image. In addition to the image, liquid crystal monitor 305 can display information including setting conditions and the like of digital camera 300. Although liquid crystal monitor 305 is described as an example of the display unit here, the display unit is not limited to that. For example, an organic EL (Electroluminescent) display may be used as the display unit.

Further, after an external USB power supply has been connected to power supply input unit 311, liquid crystal monitor 305 prompts the user to confirm whether or not to allow all operations of digital camera 300.

Flash memory 314 functions as an internal memory for storing the image data and the like. Flash memory 314 stores a program and parameters to be used by camera controller 308 in controlling digital camera 300.

Card slot 315 is connection means for connecting memory card 317 to camera body 302. Card slot 315 can be electrically and mechanically connected to memory card 317.

Memory card 317 is an external memory containing a storage element such as a flash memory. Memory card 317 can store data processed by camera controller 308 such as image data. Further, memory card 317 can output data including the stored image data. The image data read out from memory card 317 is processed by camera controller 308 and image processing unit 306 and displayed, for example, on liquid crystal monitor 305. Although memory card 317 is described as an example of the external memory here, the external memory is not limited to that. For example, a storage medium such as a hard disk may be used as the external memory.

Release button 309 receives user operation indicating an image capturing instruction or an autofocus instruction. Release button 309 receives two-stage operation of a half-press stage and a full-press stage from the user. In response to the half-press operation made by the user on release button 309, camera controller 308 performs an autofocus operation. In response to the full-press operation made by the user on release button 309, camera controller 308 records the image data generated at the moment of the full-press operation into memory card 317.

Operation unit 310 includes a directional button which can be operated upward, downward, leftward, and rightward and a mode switching button for switching the operation mode of digital camera 300 between the photographing mode and the playback mode. Camera controller 308 controls whole digital camera 300 to switch the operation mode between the photographing mode and the playback mode based on the user operation performed on the mode switching button. In response to the prompt on liquid crystal monitor 305 to confirm whether or not to allow all operations of digital camera 300, the user selects one of the options indicating to allow all operations and not to allow all operations by operating operation unit 108.

Power supply input unit 311 supplies power for driving digital camera 300. Power supply input unit 311 is a terminal for receiving power from an external USB power supply. When an external USB power supply is connected to power supply input unit 311, power supply controller 312 determines the type of the connected external USB power supply.

FIG. 4 is a table showing examples of a first function and a second function of digital camera 300. The list is stored in flash memory 314. The first function includes controlling of the liquid crystal monitor, controlling of the operation unit, and controlling of the playback mode, whereas the second function includes controlling of the CMOS image sensor, controlling of the lenses, and controlling of the photographing mode.

When digital camera 300 is powered on by power supply input unit 311 and power supply controller 312, camera controller 308 controls the power supply to supply power to the respective components of camera body 302 according to which of the unrestricted mode, the restricted mode, and the other modes including the mass storage mode digital camera 300 is in. Further, camera controller 308 controls the power supply to also supply power to lenses 301 according to which of the unrestricted mode, the restricted mode, and the other modes including the mass storage mode digital camera 300 is in. Then, lens controller 303 supplies power to lenses 301.

As described above, in the exemplary embodiment, digital camera 300 is an imaging apparatus for capturing a subject image and generating image data, the imaging apparatus including: a power supply input unit which inputs power from an external power supply; a controller which is capable of performing a first function and a second function which consumes more power than the first function does; a display unit which responds to power input to the power supply input unit by displaying whether or not to allow performance of the first function and performance of the second function; and the operation unit which receives an operation to be performed in response to the display on the display unit. The camera controller switches between allowing only the performance of the first function and allowing both of operation in the first function and the performance of the second function according to the confirmation result from the operation unit.

As a result, when a USB-AC adapter is connected to digital camera 300, the exemplary embodiment can prompt the user to select whether or not to allow all operations of digital camera 300. Therefore, when a USB-AC adapter with high power supply capability is connected to digital camera 300, the user can make digital camera 300 to perform all operations by allowing them. Accordingly, the power supply capability of the external USB power supply can be efficiently used. On the other hand, when a USB-AC adapter with low power supply capability or an unknown USB-AC adapter is connected to digital camera 300, the user can prevent such a trouble as an abrupt power-off of digital camera 300 due to lack of power supply by not allowing all operations to cause digital camera 300 to operate in the restricted mode. That is, the exemplary embodiment can provide a digital camera which prevents occurrence of malfunctions in a situation which is not expected by the user.

What is claimed is:

1. An electronic device comprising:
    an input port to which an external device is to be connected;
    a power supply controller which determines whether a connected external device is an external power supply;
    an information processing circuit which is configured to execute a first function and a second function which consumes more power than the first function does;
    a display unit which displays an inquiry about whether or not to allow execution of the first function and execution of the second function, when the power supply controller determines that the connected external device is the external power supply; and
    an operation unit which receives operation to be executed in response to the inquiry on the display unit,
    wherein the information processing circuit switches between allowing only the execution of the first function and allowing both of the execution of the first function and the execution of the second function according to the operation received by the operation unit.

2. The electronic device according to claim 1,
    wherein in a case where the information processing circuit allows the execution of the first function and the execution of the second function,
    the information processing circuit does not cause the display unit to display the inquiry about whether or not to allow the execution of the first function and the execution of the second function while power is supplied via the input port.

3. An imaging apparatus for capturing a subject image and generating image data, the imaging apparatus comprising:
    an input port to which an external device is to be connected;
    a power supply controller which determines whether a connected external device is an external power supply;
    a camera controller which is configured to execute a first function and a second function which consumes more power than the first function does;
    a display unit which displays an inquiry about whether or not to allow execution of the first function and execution of the second function, when the power supply controller determines that the connected external device is the external power supply; and
    an operation unit which receives operation to be executed in response to the inquiry on the display unit,
    wherein the camera controller switches between allowing only the execution of the first function and allowing both of the execution of the first function and the execution of the second function according to a confirmation result from the operation unit.

4. The electronic device according to claim 1, wherein each of all functions of the electronic device is classified as the first function or the second function.

* * * * *